United States Patent [19]

Kelly

[11] Patent Number: 5,076,002
[45] Date of Patent: Dec. 31, 1991

[54] LURE RELEASE ROD

[76] Inventor: Robert J. Kelly, 80 Culver Cres., London, Ontario, Canada, N5V 3G4

[21] Appl. No.: 550,012

[22] Filed: Jul. 10, 1990

[30] Foreign Application Priority Data

Nov. 6, 1989 [CA] Canada ................................. 2002283

[51] Int. Cl.⁵ .............................................. A01K 97/00
[52] U.S. Cl. .................................................... 43/17.2
[58] Field of Search ...................... 43/17.2, 5; 294/17.1

[56] References Cited

U.S. PATENT DOCUMENTS

| | | | |
|---|---|---|---|
| 1,851,370 | 3/1932 | Munger | 43/17.2 |
| 2,948,077 | 8/1960 | Karpes | 43/17.2 |
| 2,950,558 | 8/1960 | Karpes | 43/17.2 |
| 4,395,840 | 8/1983 | Banks, Jr. | 43/17.2 |
| 4,712,324 | 12/1987 | Padgett | 43/17.2 |

Primary Examiner—Kurt Rowan
Attorney, Agent, or Firm—Mitches & Co.

[57] ABSTRACT

A tool formed as telescopic longitudinal member having a V shaped end piece acts as a retrieval tool for fishing lures caught on objects under the water. The V-shaped piece has a surmounting hook like member, that is removable, for the convenience of stowing but in operation acts as the guide means along which the hook member travels on the fishing line as the rod is pushed down the fishing line to disengage a caught lure below.

1 Claim, 3 Drawing Sheets

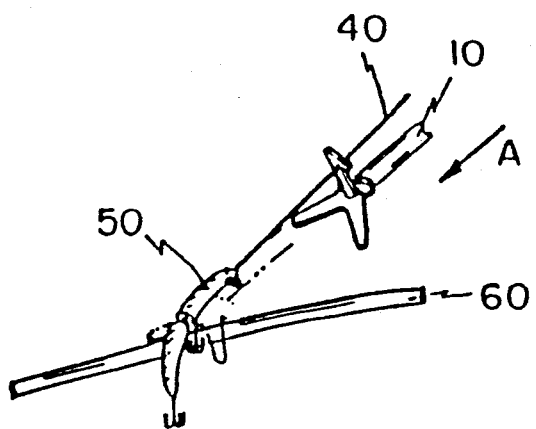
FIG. 5
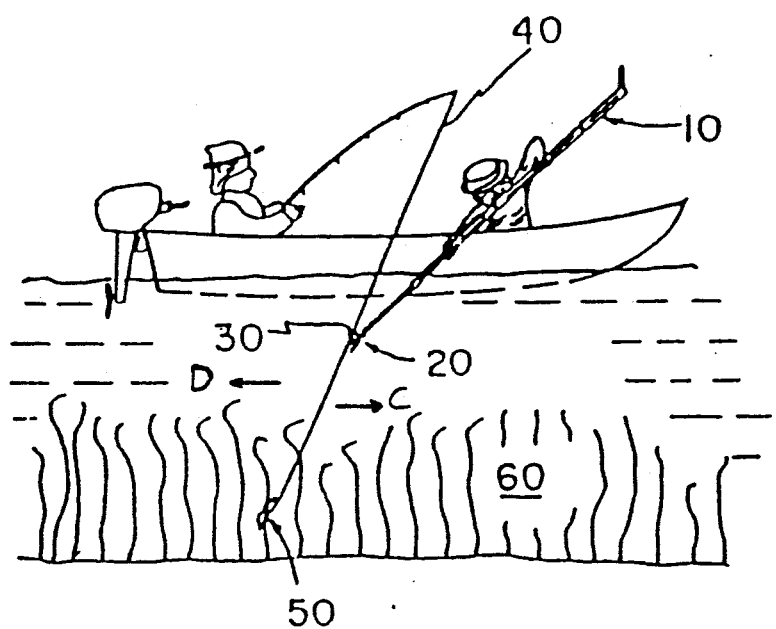
FIG. 6a
FIG. 6b

LURE RELEASE ROD

This invention relates to a collapsible rod especially suitable to remove fishing lures that are snagged under water to rocks and weeds without the need for breaking the fishing line and loosing the lure.

BACKGROUND OF THE INVENTION

One of the common complaints of fishermen is that from time to time they snag their lure and retrieval of a precious lure is difficult and in most instances aborted and the lure is lost.

SUMMARY OF THE INVENTION

I have conceived of a collapsible rod having a guide and a phalange-like extentions at one end which allows the rod to be guided down the fishing line to where the lure is snagged and to aid in its dislodgement from the snag.

The invention therefore contemplates a collapsible lure release rod comprising;

(a) a plurality of telescoping members including means for engaging the members into a rigid extended position and into a collapsed telescoping relationship, one of said members carrying;

(b) a hand element including a generally flat sheet formed into a base piece with opposite sides extending forward as a bifurcate protrusion; and, (c) an orthogonally placed hook protruding from one face of the base.

BRIEF DESCRIPTION OF THE DRAWINGS

The invention will now be described by way of example and reference to the accompanying drawings in which:

FIGS. 5, 6a, and 6b are illustrative perspective views of the movements necessary for the phalangeal end to dislodge a snag lure.

DETAILED DESCRIPTION OF THE DRAWINGS AND OF THE INVENTION

Figure 1:
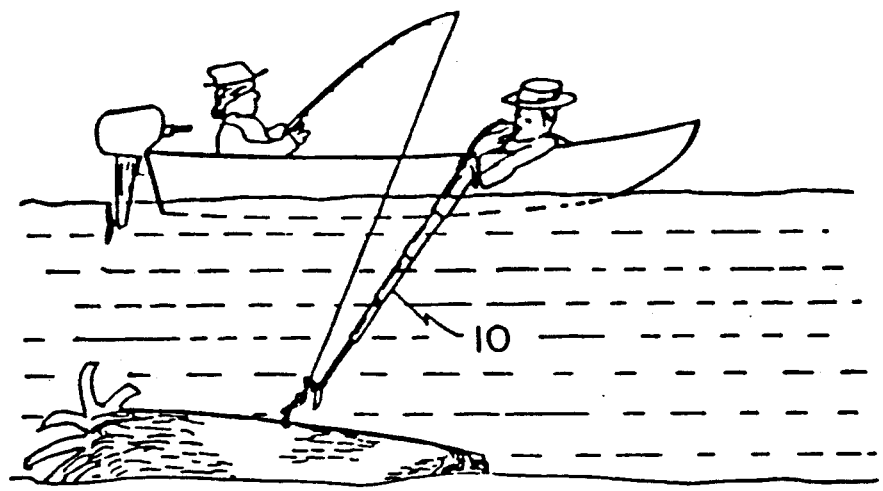
FIG. 1 is illustrative of the invention in use.
Figure 2:
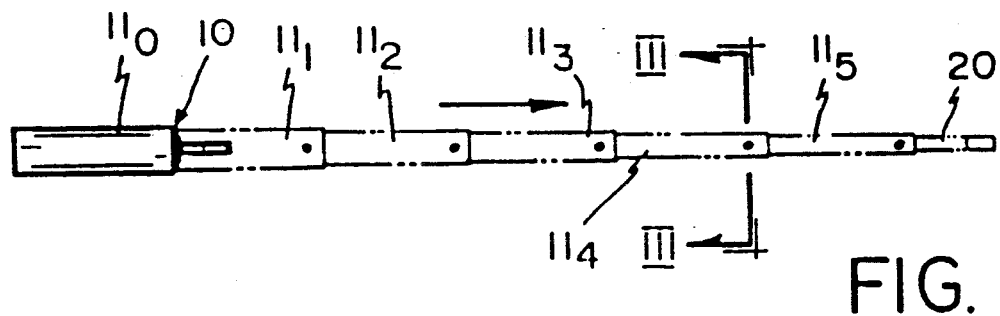
FIG. 2 is a perspective view of the collapsible rod and its extention.

Referring to FIG. 1 a collapsible lure release rod 10 according to the invention consists of a plurality of cylindrical members 11 each of outside diameter larger than its adjacent member so that the members may respectively telescope one into the other. Referring to FIGS. 1 and 2 for example the outer and largest cylindrical member $11_0$ has an internal diameter slightly larger than the external diameter of its next adjacent cylindrical member $11_1$. Similarly in relation to the other five cylindrical members $11_2$ through to and including $11_6$.

Figure 4:
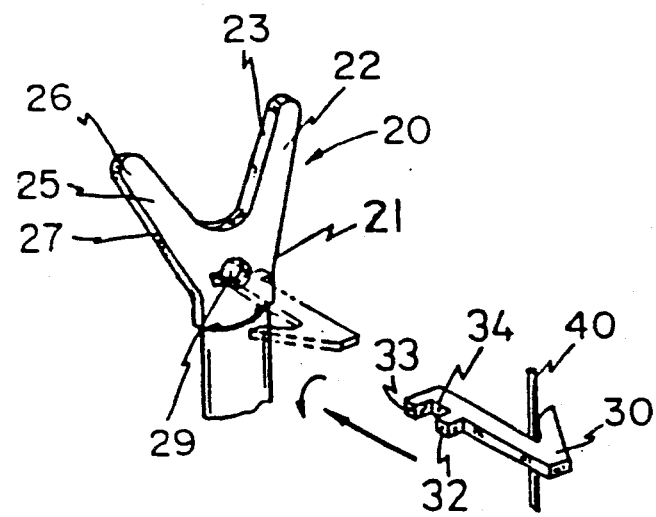
FIG. 4 is a perspective view of the phalangeal end of the rod.
Figure 7:
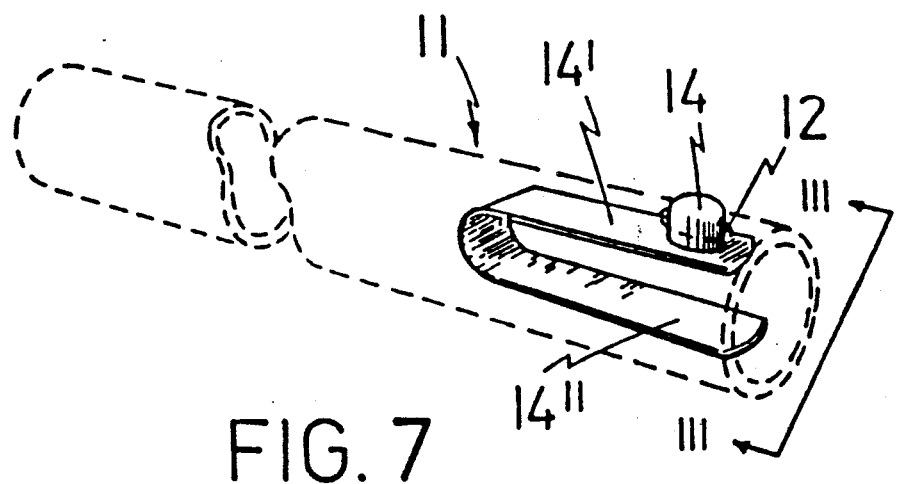
FIG. 7 is a broken away perspective showing a snap that stabilizes each section when extended.
Figure 3:
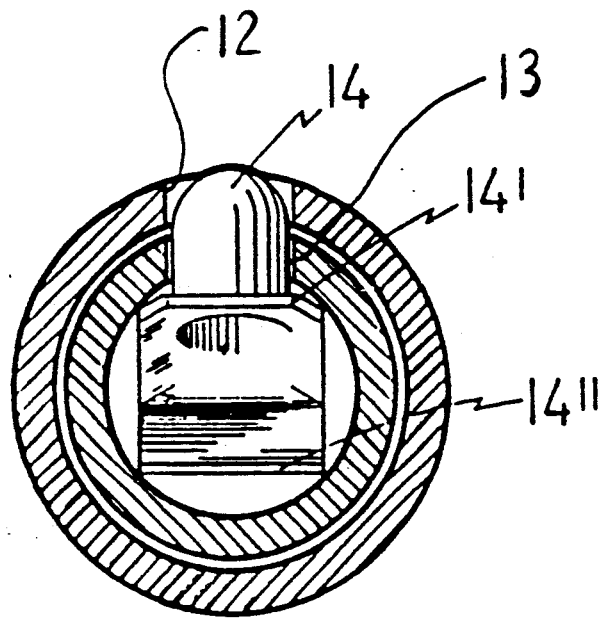
FIG. 3 is a section along III—III of FIG. 2.

In such a way the members 11 telescope into one another or may be extended into the phantom position as shown in FIG. 2. At one end of each of the telescoping members is an aperture 12 and at the other end a captive aperture 13. Inside each hollow member 11, underneath the captive aperture 13, is a spring loaded snap 14' with lower reversed leap 14" which urges against the opposite inner wall of the member 11. This is clearly seen in FIGS. 3 and 7. The upper surface of the snap 14' has cylindrical protrusions with a rounded closed top or cupola. The diameter of the protrusion 14 is slightly smaller than the apertures 12 and 13 while the cupola is at an elevation from the upper surface 14' by at least the thickness of two adjacent members, as seen in FIG. 3, so that the upper portion of the cupola extends beyond the exterior diameter of the outer member 11 and then extends through both apertures 12 when they are indexed. In that way, the rod is held secured when the cupola extends through two apertures 12 in registration; whereby, the rod is made rigid at that interjoining element. Thus each of the rod members may be extended into the phantom position of FIG. 2 and made rigid by this means. The terminal rod member $11_5$ has a hand element which is generally shown as 20 and is fixedly attached to the distal end of the smallest rod member $11_5$. The hand 20 consists of a wrist piece 21 with a key type aperture 29 defined thereby and the wrist member extends forward into bifurcate members 22 and 25 which form a smooth forward curved surface 23 and a back side piece 27. Into the key aperture 29 fits line running element 30 which is in a modified form of the digit 37 1" with laterally projecting fingers 32 and 33 which define a recess 34 which is sized to the thickness of the wrist element. The line member 30 is indexed into the aperture and rotated into the phantom position as shown in FIG. 4 and thereby becomes "snug". Referring to FIGS. 5 and 6 the hook piece 30 acts as the guide through which the fishing line 40 extends. By extending the pole 10 downward in the fashion shown in FIG. 6 the hook 30 acts as a guide directing the hand 20 toward a snagged lure 50 snagged at the bottom, and not seen in FIG. 7, but seen in FIGS. 5 and 6. By pushing the rod 10, in the direction of the arrow A of FIG. 5, the snagged lure 50 attached to a weed 60 is moved in that direction and released therefrom.

In FIG. 6 where the lure can be "seen" from the surface, the arcuate surface 25 may be placed right on the weed 60 and the lure "tugged" from the line 40 in the direction of arrow C while the rod 10 is pushed in the opposite direction according to arrow D. The lure is generally released.

We claim:

1. A collapsible lure release rod comprising:
   (a) a plurality of telescoping cylindrical members including means for engaging the members into a rigid extended position and into a collapsed telescoping relationship, one of said members carrying;
   (b) a hand element including a generally flat sheet formed into a base piece with opposite sides extending forward as a bifurcate protrusion defining a keyway aperture; and,
   (c) a hook defining a key adapted to mate with the aperture whereby the hook is locked into the aperture so as to place the hook orthogonal to the base piece and said hand element, whereby to permit the hook element to guide along a fishing line and convey said hand element toward a captured lure.

* * * * *